US012253875B1

(12) United States Patent
Kim et al.

(10) Patent No.: US 12,253,875 B1
(45) Date of Patent: Mar. 18, 2025

(54) ELECTRONIC PEDAL APPARATUS

(71) Applicants: Hyundai Motor Company, Seoul (KR); Kia Corporation, Seoul (KR)

(72) Inventors: Eun Sik Kim, Gwangmyeong-Si (KR); Hyeon Uk Kim, Daegu (KR); Kyung Nam Kim, Daegu (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 0 days.

(21) Appl. No.: 18/605,403

(22) Filed: Mar. 14, 2024

(30) Foreign Application Priority Data

Dec. 12, 2023 (KR) ........................ 10-2023-0179784

(51) Int. Cl.
*G05G 1/44* (2008.04)
*G05G 1/38* (2008.04)
*G05G 1/46* (2008.04)

(52) U.S. Cl.
CPC ................. *G05G 1/44* (2013.01); *G05G 1/38* (2013.01); *G05G 1/46* (2013.01)

(58) Field of Classification Search
None
See application file for complete search history.

(56) References Cited

U.S. PATENT DOCUMENTS

| | | | | |
|---|---|---|---|---|
| 6,321,617 | B1 * | 11/2001 | Schwyn | G05G 1/405 74/512 |
| 8,042,430 | B2 | 10/2011 | Campbell | |
| 8,931,367 | B2 * | 1/2015 | Himetani | G05G 1/46 74/512 |
| 11,307,606 | B2 | 4/2022 | Byrd et al. | |

* cited by examiner

*Primary Examiner* — Vicky A Johnson
(74) *Attorney, Agent, or Firm* — Morgan, Lewis & Bockius LLP

(57) ABSTRACT

An electronic pedal apparatus, in which a driver may operate the electronic pedal apparatus with a small effort, may operate by fine displacement when the driver operates a pedal pad, but a spring module is displaced by being pressed by the pedal pad and displaced by being pressed by a rotation lever so that a large change in pedal effort may be implemented, and safety during an operation of a pedal may be further improved by use of a dual detecting structure using first and second permanent magnets and first and second PCBs.

19 Claims, 11 Drawing Sheets

ELECTRONIC PEDAL APPARATUS

CROSS-REFERENCE TO RELATED APPLICATION

The present application claims priority to Korean Patent Application No. 10-2023-0179784, filed on Dec. 12, 2023, the entire contents of which is incorporated herein for all purposes by this reference.

BACKGROUND OF THE PRESENT DISCLOSURE

Field of the Present Disclosure

The present disclosure relates to a technology associated with an electronic pedal apparatus mounted in a vehicle and configured to generate an acceleration signal or a braking signal for a vehicle when a driver operates the electronic pedal apparatus.

Description of Related Art

An autonomous vehicle refers to a smart vehicle to which an autonomous driving technology is applied so that the vehicle autonomously arrives at a destination even though a driver does not directly manipulate a steering wheel, an accelerator pedal, and a brake pedal.

In a case in which an autonomous driving situation is universally implemented, the driver may select an autonomous driving mode in which the driver does not directly drive the vehicle and the vehicle autonomously travels to the destination.

It is necessary to enable the driver to take a rest comfortably with his feet stretched in the autonomous driving mode. If pedals (an accelerator pedal and a brake pedal) positioned in a lower space of a driver seat are kept exposed to the interior of the vehicle, the pedals disturb the driver's relaxation. If a pad of a pedal apparatus is erroneously operated regardless of the driver's intention, there is a risk that an accident occurs.

Therefore, a foldable pedal apparatus for an autonomous vehicle is being developed, in which a pedal pad is exposed to protrude toward the driver so that the driver may operate the pad in the manual driving mode in which the driver directly drives the vehicle, and the pedal pad is hidden so as not to protrude toward the driver in the autonomous driving mode so that the pad cannot be operated by the driver, ensuring the driver's comfortable relaxation and implementing safety by preventing an erroneous operation.

The general foldable pedal apparatus needs to have a space for hiding the pedal apparatus in a hidden state, and an operation mechanism is also complicated.

To solve the above-mentioned problems, a technology related to a pressure-operating pedal apparatus is being developed.

The pressure-operating pedal apparatus requires a very small operating displacement of a pedal and has a simple operation mechanism. Furthermore, the pressure-operating pedal apparatus does not require a mechanical configuration related to a foldable function, which may innovatively improve an indoor space of an autonomous driving vehicle.

However, in the case of the pressure-operating pedal apparatus, because the operating displacement of the pedal is very small, it is difficult for a driver to easily recognize a degree to which the driver operates the pedal. Therefore, there is a need for a technology to cope with the difficulty.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an electronic pedal apparatus mounted in a vehicle and configured to generate an acceleration signal or a braking signal for a vehicle when a driver operates the electronic pedal apparatus, the electronic pedal apparatus being configured to enable the driver to operate the electronic pedal apparatus even with a small effort and to easily recognize an operation situation of a pedal by increasing a change in pedal effort when the driver operates the pedal, reducing a degree of fatigue of the driver.

The present disclosure also aims to provide an electronic pedal apparatus configured to detect an operation of a pedal by use of a dual detecting structure using two permanent magnets and a PCB, further improving safety when a driver operates a pedal.

To achieve the above-mentioned objects, the present disclosure provides an electronic pedal apparatus including: a pedal pad rotatably coupled to a pedal housing by a hinge pin and configured to be operated by a driver; a spring module provided to be supported on the pedal housing and engaged to the pedal pad and configured to provide a restoring force to the pedal pad; a friction member fixed to the pedal housing; and a rotation lever rotatably coupled to the pedal pad by a first connection pin and including a first end portion rotatably coupled to the spring module by a second connection pin, and a second end portion provided to be in contact with the friction member.

The spring module may include: a spring guide rotatably coupled to the first end portion of the rotation lever by the second connection pin; and a return spring provided so that first and second opposite end portions thereof are supported on the spring guide and the pedal housing.

A friction protrusion portion may be formed on an upper surface of the friction member and be in contact with the second end portion of the rotation lever, and the friction protrusion portion may protrude into an imaginary circle defined by a radius of the second end portion of the rotation lever about the first connection pin.

The second end portion of the rotation lever may be kept in contact with the friction protrusion portion when the pedal pad is rotated and inserted into the pedal housing so that the rotation lever rotates about the first connection pin, and the first end portion of the rotation lever presses the spring module.

When the pedal pad is rotated and inserted into the pedal housing, the spring module may be displaced by being pressed by the pedal pad and displaced by being pressed by the rotation lever so that the compression amount increases.

The friction protrusion portion may be formed on the upper surface of the friction member and positioned in a direction toward the spring module.

A surface of the friction protrusion portion, which is in contact with the second end portion of the rotation lever, may be formed as an inclined surface or an arc-shaped curved surface.

A gap having a predetermined size may be formed between the pedal pad and the first end portion of the rotation lever when the pedal pad is not operated, and the gap may be increased by a rotation of the rotation lever when the driver operates the pedal pad.

When the driver does not operate the pedal pad, a position of the second connection pin may be positioned to be closer to the pedal pad than a position of the first connection pin to the pedal pad in a longitudinal direction of the spring module, and after a rotation of the pedal pad is completed, the position of the first connection pin may be positioned to be closer to the pedal pad than the position of the second connection pin to the pedal pad.

An operating characteristic protrusion may protrude from a surface of the friction protrusion portion, and operating characteristics may be implemented when the second end portion of the rotation lever is in contact with the operating characteristic protrusion and passes the operating characteristic protrusion when the rotation lever rotates.

The rotation lever may include a lever shape in which a portion between the first end portion coupled to the spring module and the second end portion being in contact with the friction member is bent at an obtuse angle about the first connection pin.

The electronic pedal apparatus may further include: a first permanent magnet coupled to the pedal pad; and a first PCB coupled to the pedal housing to face the first permanent magnet, in which the first PCB is configured to generate a signal related to a pedal function by recognizing a change in magnetic flux of the first permanent magnet when the pedal pad rotates.

The electronic pedal apparatus may further include: a second permanent magnet coupled to the pedal pad; and a second PCB coupled to the pedal housing to face the second permanent magnet, in which the second PCB is configured to generate a signal related to a pedal function by recognizing a change in magnetic flux of the second permanent magnet when the pedal pad rotates.

The first permanent magnet may be coupled at a position on the pedal pad farthest from the hinge pin, the second permanent magnet may be coupled at a position relatively closer to the hinge pin than the position of the first permanent magnet to the hinge pin, and when the pedal pad operates, the first permanent magnet may include a relatively larger movement displacement than the second permanent magnet so that the first permanent magnet is used as a main sensor, and the second permanent magnet may include a relatively smaller movement displacement than the first permanent magnet so that the second permanent magnet is used as a redundancy sensor.

The first permanent magnet may be coupled at a front end portion of the pedal pad farthest from the hinge pin, and the second permanent magnet may be coupled to one side surface relatively closer to the hinge pin than the first permanent magnet to the hinge pin without being affected by the first permanent magnet.

A pad protrusion portion may be provided at a front side of the pedal pad, a first stopper portion may be provided at a front side of the pedal housing and disposed at a portion facing the pad protrusion portion, and when the pad protrusion portion and the first stopper portion come into contact with each other, an initial position of the pedal pad and a return position of the pedal pad made by a spring force of the spring module may be restricted.

A second stopper portion may be provided at the front side of the pedal housing and disposed below the first stopper portion, and a full-stroke position of the pedal pad may be restricted when the pedal pad is rotated and inserted into the pedal housing and the pad protrusion portion comes into contact with the second stopper portion.

The hinge pin may be coupled to a lower connection portion of the pedal pad, a third stopper portion may be provided on the pedal housing and protrude toward the lower connection portion, and the full-stroke position of the pedal pad may be restricted when the pedal pad is rotated and inserted into the pedal housing and the lower connection portion comes into contact with the third stopper portion.

The full-stroke position of the pedal pad may be restricted by simultaneous contact between the pad protrusion portion and the second stopper portion and between the lower connection portion and the third stopper portion.

According to the electronic pedal apparatus according to an exemplary embodiment of the present disclosure, the driver may operate the electronic pedal apparatus with a small effort, and the pedal pad operates by fine displacement when the driver operates the pedal pad. However, the spring module is displaced by being pressed by the pedal pad and displaced by being pressed by the rotation lever so that the compression amount greatly increases, and a large change in pedal effort may be implemented by the increase in compression amount. Therefore, the driver may easily recognize the operation situation of the pedal so that a degree of fatigue of the driver may be reduced.

Furthermore, the pedal apparatus according to an exemplary embodiment of the present disclosure is configured to detect the operation of the pedal by use of the dual detecting structure using the first and second permanent magnets and the first and second PCBs, further improving the safety when the driver operates the pedal.

Furthermore, according to the pedal apparatus according to an exemplary embodiment of the present disclosure, when the driver initially operates the pedal pad, the second end portion of the rotation lever may meet the operating characteristic protrusion of the friction member to implement the operation sense so that the driver may recognize the operating characteristics of the pedal. The operating characteristic protrusion of the friction member may be applied only to the accelerator pedal, preventing an erroneous operation of the brake pedal.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
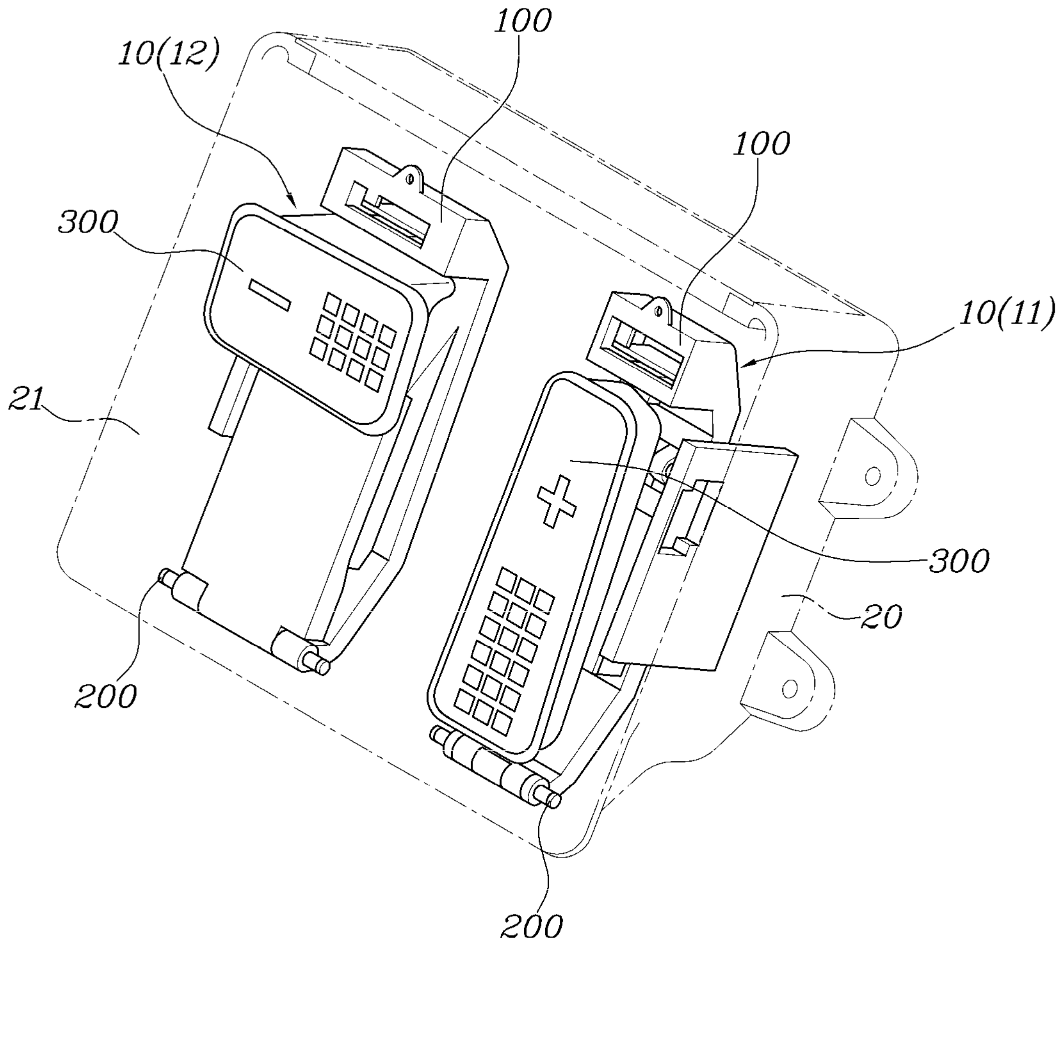
FIG. 1 is a perspective view of an electronic pedal apparatus according to an exemplary embodiment of the present disclosure.
Figure 2:
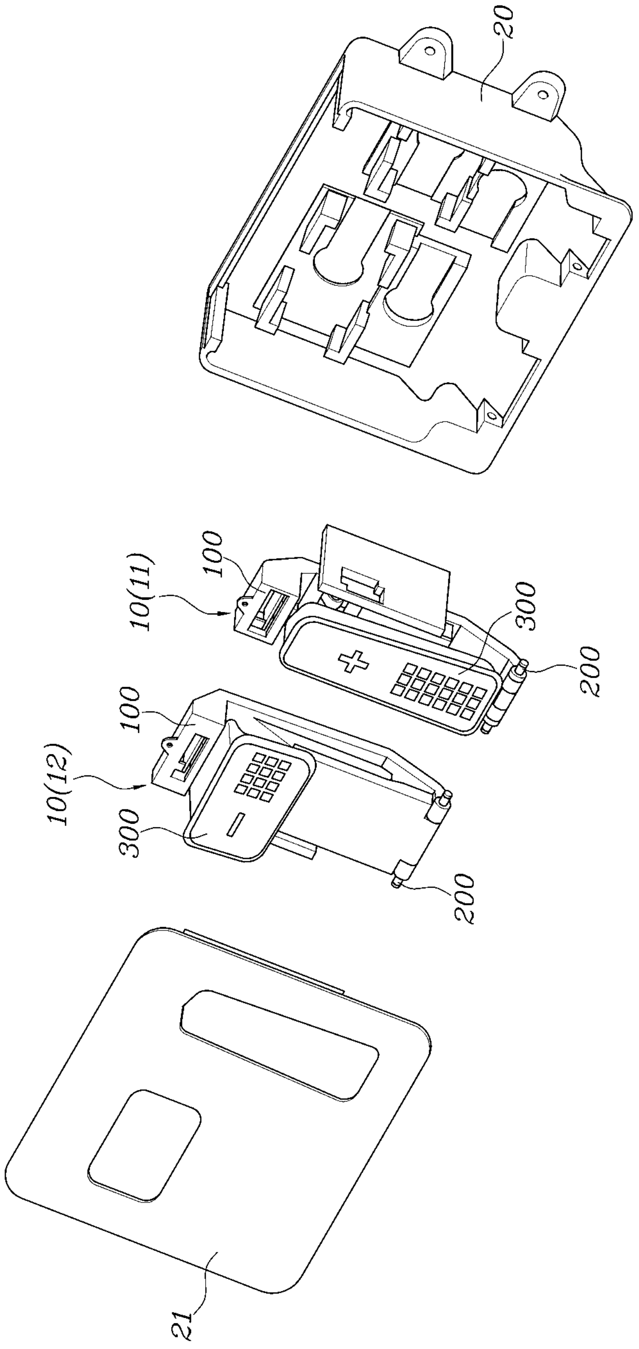
FIG. 2 is an exploded view of FIG. 1.
Figure 3:
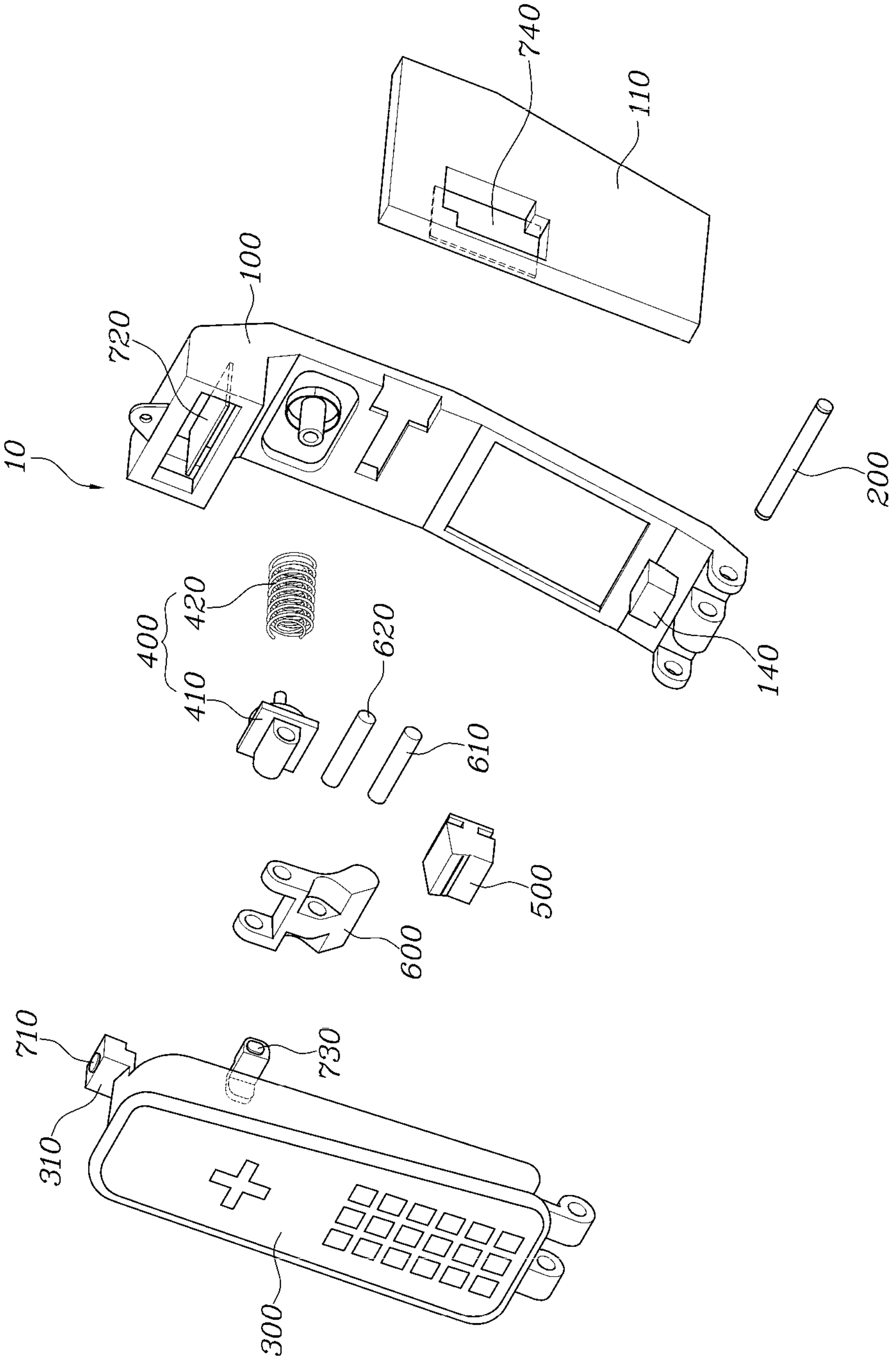
FIG. 3 is an exploded view of a pedal according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments included in the present specification will be described in detail with reference to the accompanying drawings. The same or similar constituent elements are assigned with the same reference numerals regardless of reference numerals, and the repetitive description thereof will be omitted.

The suffixes “module”, “unit”, “part”, and “portion” used to describe constituent elements in the following description are used together or interchangeably to facilitate the description, but the suffixes themselves do not have distinguishable meanings or functions.

In the description of the exemplary embodiments included in the present specification, the specific descriptions of publicly known related technologies will be omitted when it is determined that the specific descriptions may obscure the subject matter of the exemplary embodiments included in the present specification.

Furthermore, it should be interpreted that the accompanying drawings are provided only to allow those skilled in the art to easily understand the exemplary embodiments included in the present specification, and the technical spirit included in the present specification is not limited by the accompanying drawings, and includes all alterations, equivalents, and alternatives that are included in the spirit and the technical scope of the present disclosure.

The terms including ordinal numbers such as “first,” “second,” and the like may be used to describe various constituent elements, but the constituent elements are not limited by the terms. These terms are used only to distinguish one constituent element from another constituent element.

When one constituent element is described as being “coupled” or “connected” to another constituent element, it should be understood that one constituent element can be coupled or connected directly to another constituent element, and an intervening constituent element can also be present between the constituent elements.

When one constituent element is described as being “coupled directly to” or “connected directly to” another constituent element, it should be understood that no intervening constituent element is present between the constituent elements.

Singular expressions include plural expressions unless clearly described as different meanings in the context.

In the present specification, it should be understood the terms “comprises,” “comprising,” “includes,” “including,” “containing,” “has,” “having” or other variations thereof are inclusive and therefore specify the presence of stated features, integers, steps, operations, elements, components, or combinations thereof, but do not preclude the presence or addition of one or more other features, integers, steps, operations, elements, components, or combinations thereof.

Furthermore, the term “control unit” or “unit” included in the name of “motor control unit (MCU)” or “hybrid control unit (HCU)” is merely a term widely used to name a control device (controller or control unit) for controlling a vehicle function but does not mean a generic function unit.

A controller may include a communication device configured to communicate with another control unit or a sensor to control a corresponding function, a memory configured to store an operating system, a logic instruction, and input/output information, and one or more processors configured to perform determination, computation, decision, or the like required to control the corresponding function.

Hereinafter, an electronic pedal apparatus according to an exemplary embodiment of the present disclosure will be described with reference to the accompanying drawings.

An electronic pedal apparatus according to an exemplary embodiment of the present disclosure includes an organ-type micro-displacement pedal that operates with a micro-displacement when a driver operates the fine displacement pedal. As illustrated in FIGS. 1 to 11, the pedal includes a pedal pad 300 rotatably coupled to a pedal housing 100 by a hinge pin 200 and configured to be operated by the driver, a spring module 400 supported and provided on the pedal housing 100 and configured to provide a restoring force to the pedal pad 300, a friction member 500 fixedly coupled to the pedal housing 100, and a rotation lever 600 rotatably coupled to the pedal pad 300 by a first connection pin 610 and including one end portion 630 rotatably coupled to the spring module 400 by a second connection pin 620, and the other end portion 640 provided to be in contact with the friction member 500.

Pedals 10 according to the exemplary embodiment of the present disclosure include an accelerator pedal 11 and a brake pedal 12 provided in a casing 20 and spaced from each other leftward and rightward.

To prevent an erroneous operation of the driver, the accelerator pedal 11 may be provided vertically, and the brake pedal 12 may be provided horizontally. However, the present disclosure is not limited thereto.

The accelerator pedal 11 and the brake pedal 12 may be configured to be identical to each other in configurations and operations of components thereof. Therefore, the accelerator pedal 11 and the brake pedal 12 may be used in common.

Furthermore, in the description of the configuration of the accelerator pedal 11 and the configuration of the brake pedal 12, the accelerator pedal 11 and the brake pedal 12 will not be described independently, and the configuration of the pedal 10 will be representatively described below.

The casing 20 is fixed in a lower space of a driver seat and includes a box shape including a vacant space therein.

The casing 20 includes a casing cover 21, and an upper side of the casing 20 is covered by the casing cover 21.

The pedal pad 300 of the pedal 10 may be provided to protrude upwards from the casing cover 21 so that the driver may operate the pedal 10.

The pedal 10 according to an exemplary embodiment of the present disclosure may include the pedal housing 100, the pedal pad 300 configured to be operated by the driver, the spring module 400 configured to provide a restoring force to the pedal pad 300, the friction member 500 provided rearward of the spring module 400 and fixed on the pedal housing 100, and the rotation lever 600 rotatably coupled to the pedal pad 300 and configured to connect the spring module 400 and the friction member 500.

The pedal pad 300 may be configured as an organ-type pedal pad including a lower end portion rotatably coupled to the pedal housing 100 by the hinge pin 200, and an upper end portion configured to rotate forward or rearward about the hinge pin 200.

The spring module 400 may be disposed between the pedal housing 100 and the pedal pad 300 in a direction approximately perpendicular to the pedal pad 300. A lower end portion of the spring module 400 may be supported on the pedal housing 100, and an upper end portion of the spring module 400 may be supported on the pedal pad 300 by the rotation lever 600.

The friction member 500 is positioned to be spaced apart rearward from the spring module 400. A lower end portion of the friction member 500 is fixed to the pedal housing 100, and an upper end portion of the friction member 500 protrudes toward the pedal pad 300.

An approximately longitudinal middle portion of the rotation lever 600 is rotatably coupled to the pedal pad 300 by the first connection pin 610. One end portion 630, which protrudes forward relative to the first connection pin 610, is rotatably coupled to the spring module 400 by the second connection pin 620. The other end portion 640, which protrudes rearward relative to the first connection pin 610, is provided to be continuously kept in contact with an upper surface of the friction member 500.

One end portion 630 of the rotation lever 600 is supported by the spring module 400 and receives an elastic force. Therefore, the other end portion 640 of the rotation lever 600 may be always kept in contact with the friction member 500 regardless of the rotation of the pedal pad 300.

Because the other end portion 640 of the rotation lever 600 is always kept in contact with the friction member 500 when the driver operates the pedal pad 300, a predetermined degree of hysteresis may be implemented when the driver operates the pedal pad 300.

The spring module 400 according to an exemplary embodiment of the present disclosure may include a spring guide 410 rotatably coupled to the rotation lever 600 by the second connection pin 620, and a return spring 420 provided so that two opposite end portions thereof are supported by the spring guide 410 and the pedal housing 100.

The spring module 400 may be disposed below the pedal pad 300 and extend in a direction approximately perpendicular to the longitudinal direction of the pedal pad 300.

The return spring 420, which forms the spring module 400, may be provided as a plurality of return springs having different spring forces to implement fail-safe and an efficient pedal effort.

When the pedal pad 300 is rotated forward and inserted into the casing 20 by operation of the driver, an operating force of the pedal pad 300 is transmitted to the return spring 420 through the rotation lever 600 so that the return spring 420 is compressed. When the operating force of the driver is eliminated from the pedal pad 300 in the state in which the pedal pad 300 is rotated, the return spring 420 rotates the pedal pad 300 reversely by applying a spring force while being restored in shape and returns the pedal pad 300 to an initial position.

According to an exemplary embodiment of the present disclosure, the lower end portion of the friction member 500 is fixed to the pedal housing 100, the upper end portion of the friction member 500 protrudes toward the rotation lever 600, and an upper surface of the upper end portion of the friction member 500 is provided to be in contact with the other end portion 640 of the rotation lever 600.

A friction protrusion portion 510 is formed on the upper surface of the friction member 500 and provided to be in contact with the other end portion 640 of the rotation lever 600. The friction protrusion portion 510 may be formed to protrude into a circle R1 defined by the other end portion 640 of the rotation lever 600 about the first connection pin 610.

One end portion 630 of the rotation lever 600 is coupled to the spring guide 410, which forms the spring module 400, by the second hinge pin 620. The other end portion 640 of the rotation lever 600 is provided to be in contact with the friction protrusion portion 510 formed on the upper surface of the friction member 500.

When the circle R1 is defined about the first connection pin 610 based on a point at which the other end portion 640 of the rotation lever 600 is in contact with the friction protrusion portion 510, the friction protrusion portion 510 protrudes into the circle R1.

The pedal apparatus according to an exemplary embodiment of the present disclosure may include the structure in which the other end portion 640 of the rotation lever 600 is kept in contact with the friction protrusion portion 510 when the pedal pad 300 is rotated and inserted into the pedal housing 100 so that one end portion 630 of the rotation lever 600 presses the spring module 400 when the rotation lever 600 rotates about the first connection pin 610.

The friction protrusion portion 510 of the friction member 500 protrudes into the circle R1 of the rotation lever 600, one end portion 630 of the rotation lever 600 is supported by the spring module 400 and receives the elastic force, and the other end portion 640 of the rotation lever 600 is kept in contact with the friction protrusion portion 510 so that when the driver operates the pedal pad 300, the rotation lever 600 may rotate clockwise about the first connection pin 610, and one end portion 630 of the rotation lever 600 may press the spring module 400.

According to the pedal apparatus according to an exemplary embodiment of the present disclosure, when the pedal pad 300 is rotated and inserted into the pedal housing 100, the spring module 400 is displaced by being pressed by the pedal pad 300 and displaced by being pressed by the rotation lever 600 so that the amount of compressing the spring module 400 greatly increases, which may implement a large pedal effort.

When the driver operates the pedal pad 300, the upper end portion of the pedal pad 300 is rotated about the hinge pin 200 and inserted into the pedal housing 100.

One end portion 630 of the rotation lever 600 is connected to the spring module 400, and the other end portion 640 of the rotation lever 600 is in line contact or surface contact with the friction protrusion portion 510 of the friction member 500. Therefore, when the pedal pad 300 rotates, the rotation lever 600 rotates about the first connection pin 610 in the state in which the other end portion 640 of the rotation lever 600 is kept in contact with the friction member 500 so that one end portion 630 of the rotation lever 600 presses the spring module 400.

Therefore, the spring module 400 is displaced by being pressed by the pedal pad 300 and displaced by being pressed by the rotation lever 600 so that the amount of compressing the spring module 400 increases, and a large change in pedal effort may be implemented by the increase in compression amount. Therefore, the driver may easily recognize the operation situation of the pedal so that a degree of fatigue of the driver may be reduced.

The friction protrusion portion 510 according to an exemplary embodiment of the present disclosure may be provided on the upper surface of the friction member 500 and positioned in the direction toward the spring module 400.

The friction protrusion portion 510 is formed on the upper surface of the friction member 500 that faces the second end portion of the rotation lever 600. The friction protrusion portion 510 may be provided on the upper surface of the friction member 500 and positioned in the direction toward the spring module 400.

When the driver does not operate the pedal pad 300, the friction protrusion portion 510 is in contact with the other end portion of the rotation lever 600 and is configured to fix the position of the rotation lever 600. When the driver operates the pedal pad 300, the friction protrusion portion 510 is configured to rotate the rotation lever 600 about the first connection pin 610 and to allow one end portion 630 of the rotation lever 600 to press the spring module 400.

Furthermore, the friction protrusion portion 510 is also configured to prevent the rotation and withdrawal of the rotation lever 600 at the time of assembling the pedal apparatus.

That is, because the spring module 400 supports one end portion 630 of the rotation lever 600 and applies the elastic force at the time of assembling the pedal, the rotation lever 600 may receive a force for rotating the rotation lever 600 counterclockwise about the first connection pin 610.

Therefore, the friction protrusion portion 510 is provided on the upper surface of the friction member 500 and positioned in the direction toward the spring module 400, and the friction protrusion portion 510 protrudes into the circle R1 of the rotation lever 600 and is in contact with the other end portion 640 of the rotation lever 600. Therefore, the friction protrusion portion 510 may prevent the rotation lever 600 from rotating counterclockwise about the first connection pin 610 and prevent the rotation and withdrawal of the rotation lever 600 at the time of assembling the pedal, ensuring the stable quality of the rotation lever 600.

According to an exemplary embodiment of the present disclosure, the surface of the friction protrusion portion 510, which is in contact with the other end portion of the rotation lever 600, may be formed as an inclined surface 511 or an arc-shaped curved surface 512.

Figure 6:
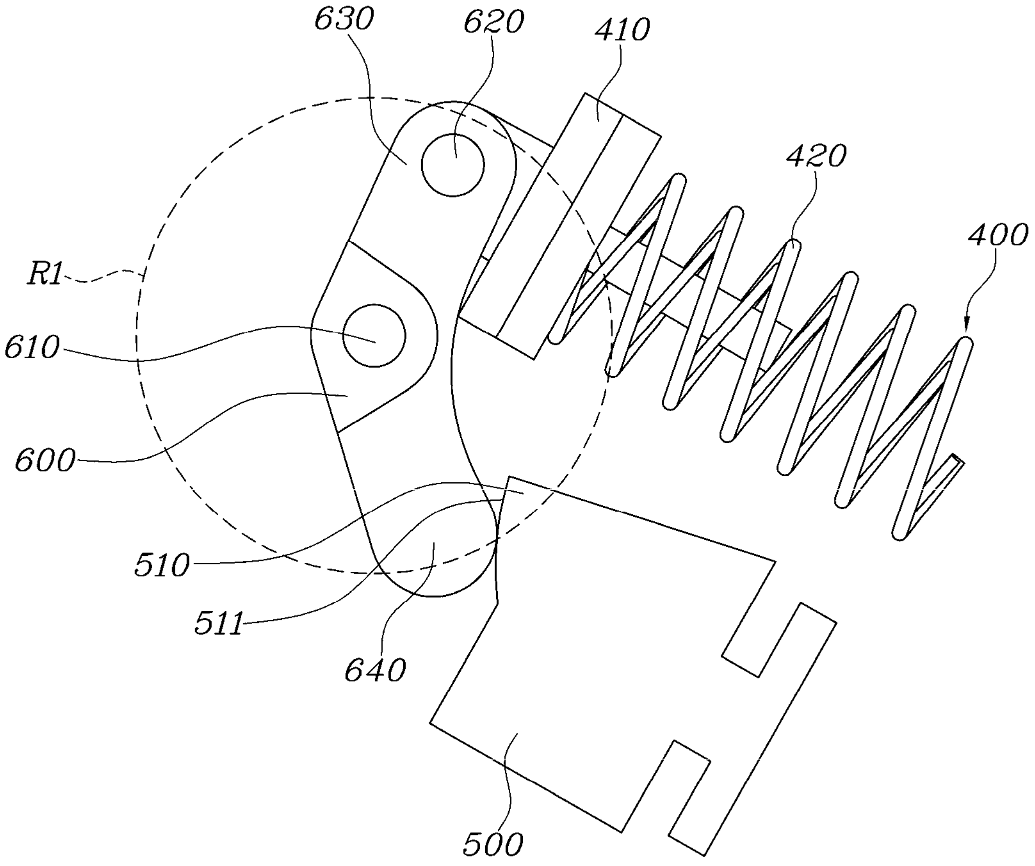
FIG. 6, FIG. 7, FIG. 8, and FIG. 9 are views for explaining a spring module, a friction member, and a rotation lever according to an exemplary embodiment of the present disclosure.
Figure 7:
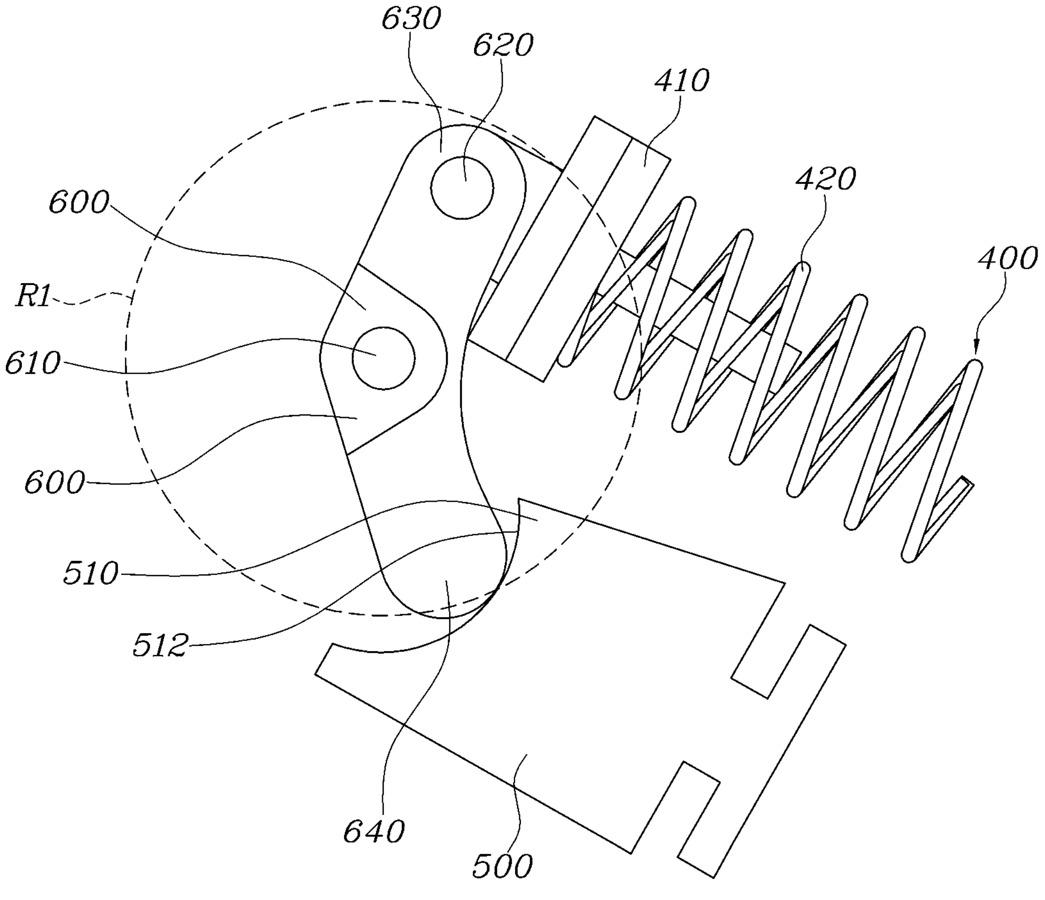
Figure 8:
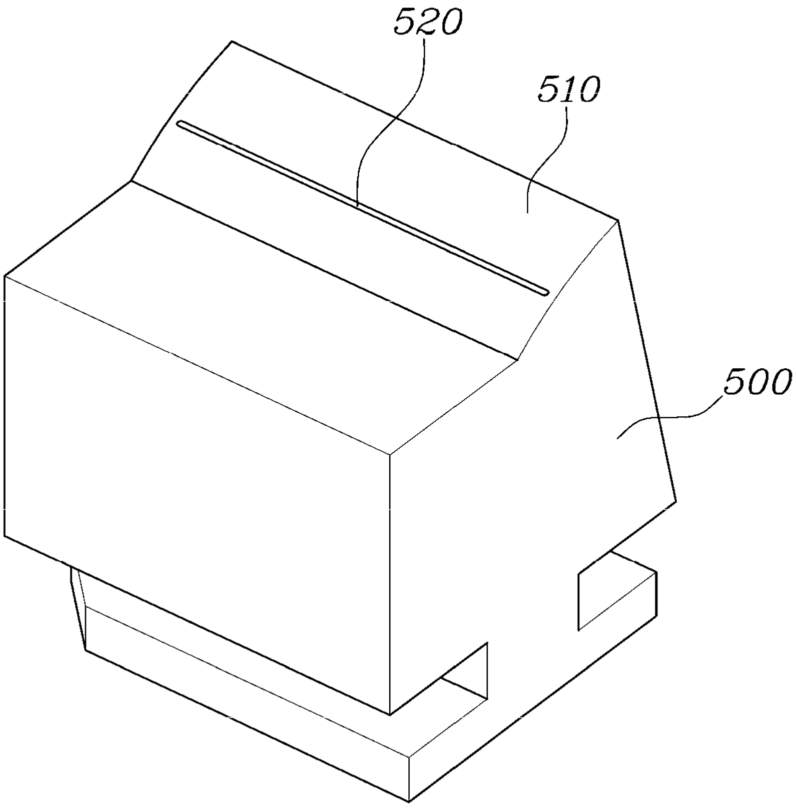
Figure 9:
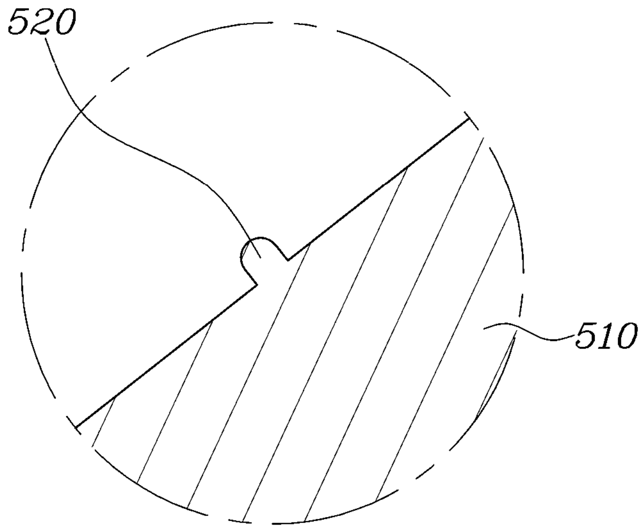

As illustrated in FIG. 6, when the surface of the friction protrusion portion 510 is formed as the inclined surface 511, the rotation amount of the rotation lever 600 increases in a form of a linear function so that an increased pedal effort may be implemented. As illustrated in FIG. 7, when the surface of the friction protrusion portion 510 is formed as the arc-shaped curved surface 512, the rotation amount of the rotation lever 600 increases in a form of a quadratic function so that the pedal effort may greatly increase, and the degree of hysteresis may also greatly change and increase.

Furthermore, the protrusion amount of the friction member 500 protruding from the pedal housing 100 may be appropriately selected by tuning so that various operating forces may be implemented.

As the protrusion amount of the friction member 500 increases, the rotation amount of the rotation lever 600 increases so that the great change in pedal effort and the high degree of hysteresis may be implemented.

In the pedal apparatus according to an exemplary embodiment of the present disclosure, a gap G1 having a predetermined size may be formed between the pedal pad 300 and one end portion 630 of the rotation lever 600 when the driver does not operate the pedal pad 300. The gap G1 is increased by the rotation of the rotation lever 600 when the driver operates the pedal pad 300.

One end portion 630 of the rotation lever 600 is supported by the spring module 400, and the other end portion 640 is in contact with the friction protrusion portion 510 of the friction member 500.

Figure 4:
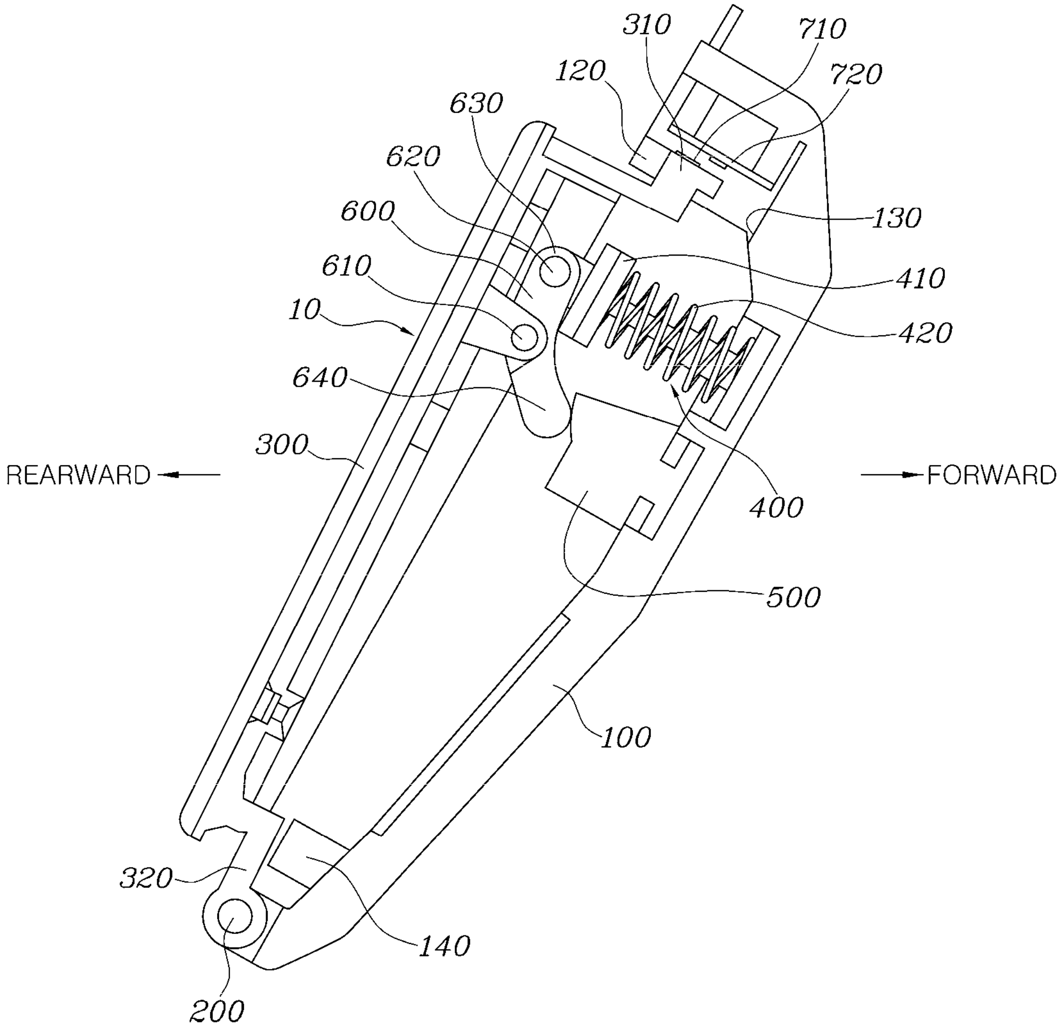
FIG. 4 is a cross-sectional view of the pedal according to an exemplary embodiment of the present disclosure in a state in which a pedal pad is not operated.
Figure 5:
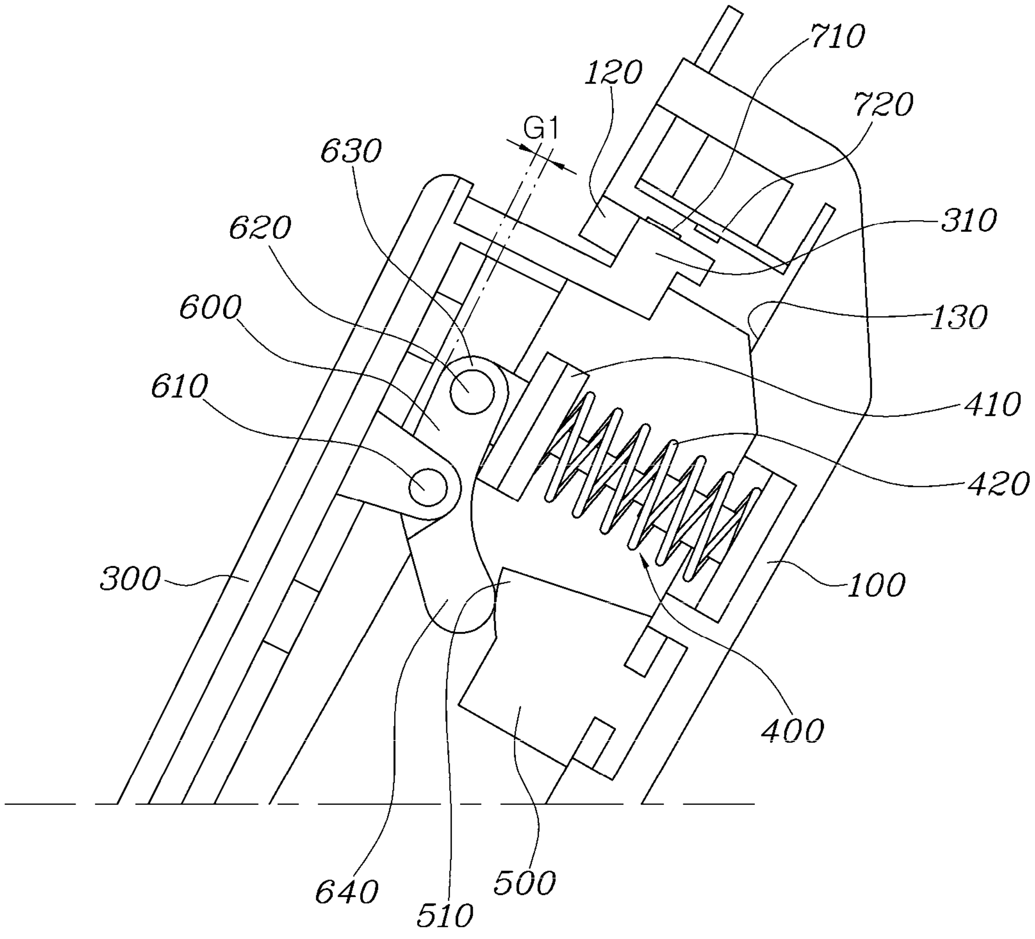
FIG. 5 is an enlarged view of a portion where a rotation lever in FIG. 4 is provided.

With reference to FIGS. 4 to 5, in the initial state in which the driver does not operate the pedal pad 300, the gap G1 having a predetermined size is formed between a bottom surface of the pedal pad 300 and one end portion 630 of the rotation lever 600 so that the other end portion 640 of the rotation lever 600 and the friction protrusion portion 510 of the friction member 500 are assuredly kept in contact with each other.

Figure 10:
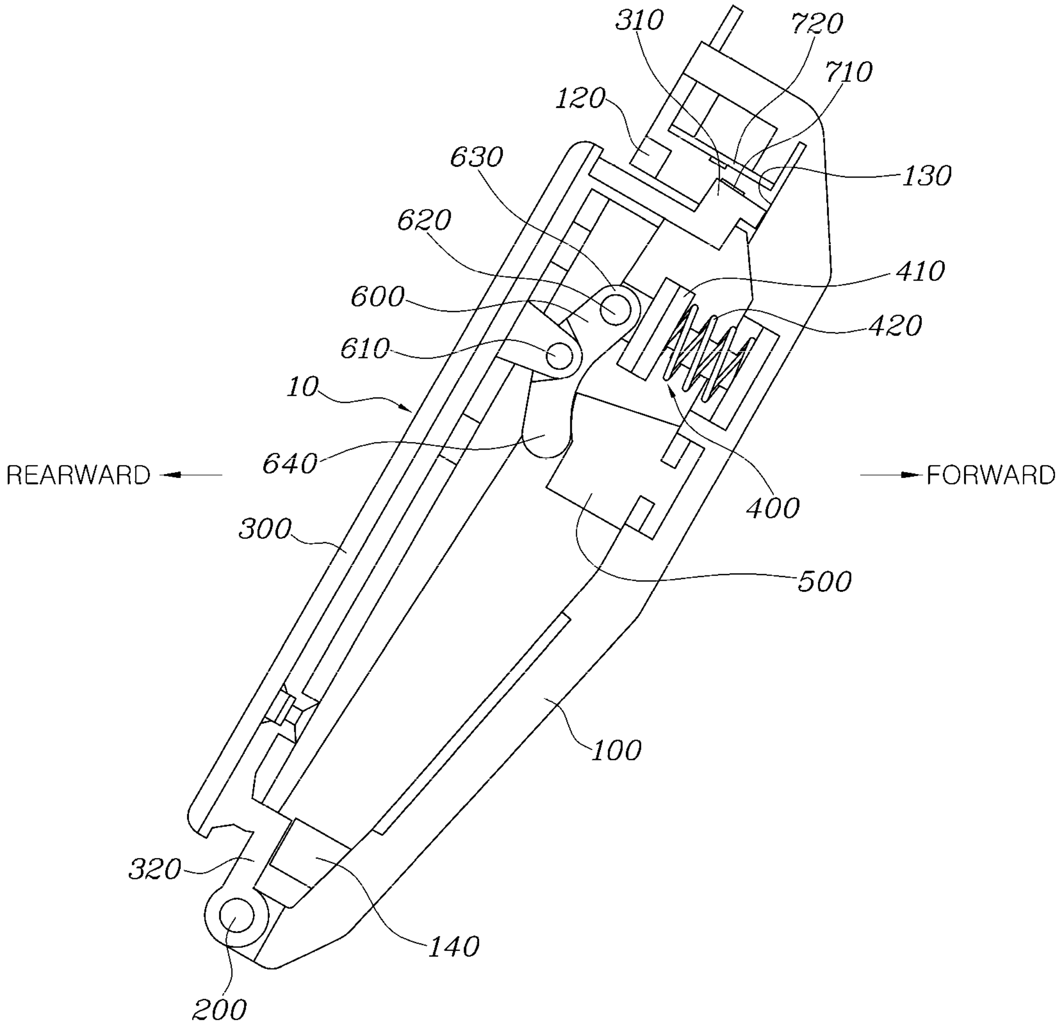
FIG. 10 is a view exemplarily illustrating a full-stroke state of the pedal pad.
Figure 11:
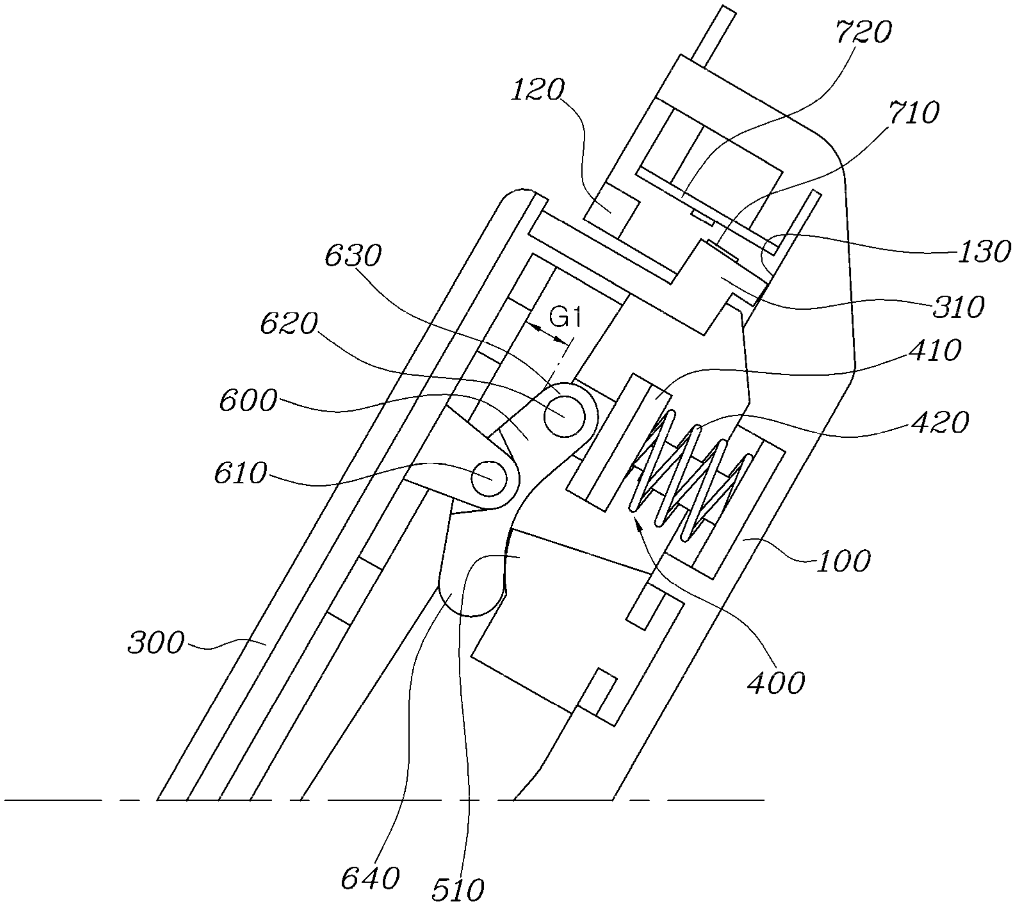
FIG. 11 is an enlarged view of FIG. 10.

With reference to FIGS. 10 to 11, when the pedal pad 300 is rotated and inserted into the pedal housing 100 by operation of the driver, the rotation lever 600 rotates clockwise about the first connection pin 610. In the instant case, one end portion 630 of the rotation lever 600 rotates in the direction in which one end portion 630 of the rotation lever 600 presses the spring module 400. Therefore, the gap G1 having predetermined size and formed between the pedal pad 300 and one end portion 630 of the rotation lever 600 gradually increases as the rotation amount of the rotation lever 600 increases.

The configuration in which the gap G1 increases when the pedal pad 300 is rotated by operation of the driver means that the rotation lever 600 rotates smoothly and the rotation lever 600 presses the spring module 400 as much as the increased gap G1 allows. Therefore, a large pedal effort may be implemented so that the driver may easily recognize the operation situation of the pedal.

In the pedal apparatus according to an exemplary embodiment of the present disclosure, when the driver does not operate the pedal pad 300, the position of the second connection pin 620 is positioned to be closer to the pedal pad 300 than the position of the first connection pin 610 to the pedal pad 300 in the longitudinal direction of the spring module 400. After the rotation of the pedal pad 300 is completed as the driver operates the pedal pad 300, the position of the first connection pin 610 may be positioned to be closer to the pedal pad 300 than the position of the second connection pin 620 to the pedal pad 300.

That is, after the rotation of the pedal pad 300 is completed as the driver operates the pedal pad 300, the position of the first connection pin 610 and the position of the second connection pin 620 are changed oppositely in comparison with the state in which the driver does not operate the pedal pad 300.

With reference to FIGS. 4 to 5, when the driver does not operate the pedal pad 300, the state in which the rotation lever 600 is rotated counterclockwise about the first connection pin 610 is maintained by the elastic force of the spring module 400. Therefore, the position of the second connection pin 620 is positioned to be closer to the pedal pad 300 than the position of the first connection pin 610 to the pedal pad 300.

When the driver operates the pedal pad 300, the pedal pad 300 is rotated and inserted into the pedal housing 100. In the instant case, the rotation lever 600 rotates clockwise about the first connection pin 610, and at the same time, one end portion of the rotation lever 600 presses the spring module 400.

As the rotation lever 600 rotates clockwise, the position of the second connection pin 620 gradually moves in a direction in which the position of the second connection pin 620 becomes identical to the position of the first connection pin 610.

With reference to FIGS. 10 to 11, in a full-stroke situation in which the rotation of the pedal pad 300 is completed by operation of the driver, the position of the first connection pin 610 is closer to the pedal pad 300 than the position of the second connection pin 620 to the pedal pad 300 so that the positions are changed to be opposite to the positions made when the pedal is not operated.

The configuration in which the position of the first connection pin 610 and the position of the second connection pin 620 are changed oppositely by the rotation of the pedal pad 300 by operation of the driver means that the rotation lever 600 rotates smoothly, and the gap G1 is increased by the rotation of the rotation lever 600. Therefore, the rotation lever 600 may press the spring module 400, which may implement a large pedal effort.

According to an exemplary embodiment of the present disclosure, an operating characteristic protrusion 520 may protrude by a predetermined height from a surface of the friction protrusion portion 510 and implement operating characteristics when the other end portion 640 of the rotation lever 600, which is in contact with the operating characteristic protrusion 520, passes the operating characteristic protrusion 520 when the rotation lever 600 rotates.

When the rotation lever 600 rotates during the initial operation of the pedal, the other end portion 640 of the rotation lever 600 climbs over and passes the operating characteristic protrusion 520 while being kept in contact with the friction protrusion portion 510. In the instant case, an operation sense may be implemented, and the driver may recognize the operating characteristics of the pedal.

The operating characteristic protrusion 520 of the friction member 500 may be applied only to the accelerator pedal 11 without being applied to the brake pedal 12, preventing the driver from erroneously operating the pedal.

The rotation lever 600 according to an exemplary embodiment of the present disclosure may include a lever shape in which a portion between one end portion 630 coupled to the spring module 400 and the other end portion 640 being in contact with the friction member 500 is bent at an obtuse angle about the first connection pin 610.

The rotation lever 600 may include a lever shape bent at an obtuse angle to increase the rotation amount and implement the smooth contact with the friction member 500 when the driver operates the pedal pad 300.

The rotation amount of the rotation lever 600, which includes a lever shape bent at an obtuse angle and rotates about the first connection pin 610, is greater than the rotation amount of the pedal pad 300 so that the rotation lever 600 may further compress the spring module 400, which may implement a high degree of hysteresis together with a great change in pedal effort.

The pedal apparatus according to an exemplary embodiment of the present disclosure may further include a first permanent magnet 710 coupled to the pedal pad 300, and a first printed circuit board (PCB) 720 coupled to the pedal housing 100 to face the first permanent magnet 710. When the pedal pad 300 rotates, the first PCB 720 may recognize a change in magnetic flux of the first permanent magnet 710 and generate signals related to pedal functions. The signal related to the pedal function may be a signal related to braking or a signal related to acceleration.

Furthermore, the pedal apparatus according to an exemplary embodiment of the present disclosure may further include a second permanent magnet 730 coupled to the pedal pad 300, and a second PCB 740 coupled to the pedal housing 100 to face the second permanent magnet 730. When the pedal pad 300 rotates, the second PCB 740 may recognize a change in magnetic flux of the second permanent magnet 730 and generate signals related to pedal functions. The signal related to the pedal function may be a signal related to braking or a signal related to acceleration.

The second PCB 740 is coupled to a sensor cover 110. Because the sensor cover 110 is coupled to the pedal housing 100 and integrated with the pedal housing 100, the pedal housing 100 may be considered as a component including the sensor cover 110. Therefore, in an exemplary embodiment of the present disclosure, the second PCB 740 may be coupled to the pedal housing 100.

The first and second PCBs 720 and 740 may each include a Hall sensor. When the pedal pad 300 operates, the first and second PCBs 720 and 740 may detect a change in magnetic flux and transmit a pedal operating signal to a vehicle controller operatively connected to the first and second PCBs 720 and 740.

According to an exemplary embodiment of the present disclosure, the first permanent magnet 710 is coupled at a position on the pedal pad 300 farthest from the hinge pin 200, and the second permanent magnet 730 is coupled at a position relatively closer to the hinge pin 200 than the position of the first permanent magnet 710 to the hinge pin 200.

Therefore, when the pedal pad 300 operates, the first permanent magnet 710 includes a relatively larger movement displacement than the second permanent magnet 730 so that the first permanent magnet 710 may be used as a main sensor. The second permanent magnet 730 includes a relatively smaller movement displacement than the first permanent magnet 710 so that the second permanent magnet 730 may be used as a redundancy sensor.

The first permanent magnet 710 may be coupled and positioned at a front end portion of the pedal pad 300 farthest from the hinge pin 200. The second permanent magnet 730 may be coupled and positioned on one side surface relatively closer to the hinge pin 200 than the first permanent magnet 710 to the hinge pin 200 without being affected by the first permanent magnet 710.

In the pedal apparatus according to an exemplary embodiment of the present disclosure, the first PCB 720 and the second PCB 740 may respectively transmit signals and ensure the redundancy when the pedal pad 300 is rotated by operation of the driver.

The first permanent magnet 710 may be disposed at the front end portion, i.e., the position on the pedal pad 300 farthest from the hinge pin 200, so that the first permanent magnet 710 includes a large movement displacement when the pedal pad is operated. Therefore, the first PCB 720 may be used as a main sensor that more accurately detects the operation amount of the pedal.

The second permanent magnet 730 is disposed at the position relatively closer to the hinge pin 200 than the position of the first permanent magnet 710 to the hinge pin 200 and disposed on one side surface of the pedal pad 300 which is not affected by the magnetic flux of the first permanent magnet 710 so that the second permanent magnet 730 includes a relatively smaller movement displacement than the first permanent magnet 710 when the pedal pad operates. Therefore, the second PCB 740 may be used as a redundancy sensor in the event of a breakdown of the first PCB 720.

As described above, the pedal apparatus according to an exemplary embodiment of the present disclosure may perform stable and accurate detecting through the redundancy of sensors.

According to an exemplary embodiment of the present disclosure, a pad protrusion portion 310 may be provided at a front side of the pedal pad 300, and a first stopper portion 120 may be provided at a front side of the pedal housing 100 and disposed at a portion facing the pad protrusion portion 310. When the pad protrusion portion 310 and the first stopper portion 120 come into contact with each other, an initial position of the pedal pad 300 and a return position of the pedal pad 300 made by the spring force of the return spring 420 may be restricted.

In the pedal apparatus according to an exemplary embodiment of the present disclosure, the pad protrusion portion 310 protrudes forward from the front end portion of the pedal pad 300, and the first stopper portion 120 is provided at the position on the pedal housing 100 that faces the pedal protrusion portion 310.

The first stopper portion 120 is positioned above the pedal protrusion portion 310 along a rotation radius of the pedal pad 300 defined about the hinge pin 200.

Therefore, when the driver operates the pedal pad 300, the upper end portion of the pedal pad 300 rotates downward about the hinge pin 200. In the instant case, the return spring 400 is compressed. When the operating force of the driver is eliminated from the pedal pad 300, the pedal pad 300 is rotated reversely by the restoring force of the return spring 420 and returns to the initial position thereof. Therefore, the initial position and the return position of the pedal pad 300 may be restricted by the contact between the pedal protrusion portion 310 and the first stopper portion 120 (see FIGS. 4 to 5).

The first permanent magnet 710 may be coupled to a front surface of the pedal protrusion portion 120.

Furthermore, in the pedal apparatus according to an exemplary embodiment of the present disclosure, a second stopper portion 130 is provided at the front side of the pedal housing 100 and disposed below the first stopper portion 120. A full-stroke position of the pedal pad 300 may be restricted when the pedal pad 300 is rotated and inserted into the pedal housing 100 and the pad protrusion portion 310 comes into contact with the second stopper portion 130.

The first stopper portion 120 and the second stopper portion 130 may be spaced from each other vertically and provided at the front side of the pedal housing 100 that faces the pad protrusion portion 310.

The first stopper portion 120 and the second stopper portion 130 are positioned to be spaced from each other vertically on the rotation radius of the pedal pad 300 defined about the hinge pin 200, and the pad protrusion portion 310 is positioned between the first stopper portion 120 and the second stopper portion 130.

Therefore, in the pedal apparatus according to an exemplary embodiment of the present disclosure, the full-stroke position of the pedal pad may be restricted when the pedal pad 300 is rotated and inserted into the pedal housing 100 by the operation of the driver and the pad protrusion portion 310 comes into contact with the second stopper portion 130.

When the driver operates the pedal pad 300, the upper end portion of the pedal pad 300 is rotated downward about the hinge pin 200 and inserted into the pedal housing 100. In the instant case, the full-stroke position of the pedal pad 300 may be restricted as the pad protrusion portion 310 provided on the pedal pad 300 comes into contact with the second stopper portion 130 provided on the pedal housing 100 (see FIGS. 10 to 11).

Furthermore, in the pedal apparatus according to an exemplary embodiment of the present disclosure, the hinge pin 200 is coupled to a lower connection portion 320 of the pedal pad 300, and a third stopper portion 140 is provided on the pedal housing 100 and protrudes toward the lower connection portion 320. Therefore, the full-stroke position of the pedal pad 300 may be restricted when the pedal pad 300 is rotated and inserted into the pedal housing 100 and the lower connection portion 320 comes into contact with the third stopper portion 140.

In the pedal apparatus according to an exemplary embodiment of the present disclosure, when the pedal pad 300 is rotated and inserted into the pedal housing 100 by operation of the driver, the full-stroke position of the pedal pad 300 may be restricted by the simultaneous contact between the pad protrusion portion 310 and the second stopper portion 130 and between the lower connection portion 320 and the third stopper portion 140.

Because the driver may apply a large amount of load during the full stroke of the pedal pad 300, the third stopper portion 140 may be additionally provided on the pedal housing 100. In the instant case, the supporting force for the operation of the pedal pad 300 may be sufficiently ensured while the full-stroke position of the pedal pad 300 is restricted by the simultaneous contact between the pad protrusion portion 310 and the second stopper portion 130 and between the lower connection portion 320 and the third stopper portion 140.

As described above, according to the electronic pedal apparatus according to an exemplary embodiment of the present disclosure, the driver may operate the electronic pedal apparatus with a small effort, and the pedal pad 300 operates by fine displacement when the driver operates the pedal pad 300. However, the spring module 400 is displaced by being pressed by the pedal pad 300 and displaced by being pressed by the rotation lever 600 so that the compression amount greatly increases, and a large change in pedal effort may be implemented by the increase in compression amount. Therefore, the driver may easily recognize the operation situation of the pedal so that a degree of fatigue of the driver may be reduced.

Furthermore, the pedal apparatus according to an exemplary embodiment of the present disclosure is configured to detect the operation of the pedal by use of the dual detecting structure using the first and second permanent magnets 710 and 730 and the first and second PCBs 720 and 740, further improving the safety when the driver operates the pedal.

Furthermore, according to the pedal apparatus according to an exemplary embodiment of the present disclosure, when the driver initially operates the pedal pad 300, the other end portion 640 of the rotation lever 600 may meet the operating characteristic protrusion 520 of the friction member 500 to implement the operation sense so that the driver may recognize the operating characteristics of the pedal. The operating characteristic protrusion 520 of the friction member 500 may be applied only to the accelerator pedal 11, preventing an erroneous operation of the brake pedal 12.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured for processing data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An electronic pedal apparatus comprising:

a pedal pad rotatably coupled to a pedal housing by a hinge pin and configured to be operated by a driver;

a spring module provided to be supported on the pedal housing and engaged to the pedal pad and configured to provide a restoring force to the pedal pad;

a friction member fixed to the pedal housing; and a rotation lever rotatably coupled to the pedal pad by a first connection pin and including a first end portion rotatably coupled to the spring module by a second connection pin, and a second end portion provided to be in contact with the friction member.

2. The electronic pedal apparatus of claim 1, wherein the spring module includes:

a spring guide rotatably coupled to the first end portion of the rotation lever by the second connection pin; and a return spring provided so that first and second opposite end portions thereof are supported on the spring guide and the pedal housing.

3. The electronic pedal apparatus of claim 1, further including a friction protrusion portion formed on an upper surface of the friction member, wherein the friction protrusion portion is in contact with the second end portion of the rotation lever, and the friction protrusion portion protrudes into an imaginary circle defined by a radius of the second end portion of the rotation lever about the first connection pin.

4. The electronic pedal apparatus of claim 3, wherein the second end portion of the rotation lever is kept in contact with the friction protrusion portion in a situation that the pedal pad is rotated and inserted into the pedal housing so that the rotation lever rotates about the first connection pin, and the first end portion of the rotation lever presses the spring module.

5. The electronic pedal apparatus of claim 1, wherein in a situation that the pedal pad is rotated and inserted into the pedal housing, the spring module is displaced by being pressed by the pedal pad and displaced by being pressed by the rotation lever so that a compression amount of the spring module increases.

6. The electronic pedal apparatus of claim 3, wherein the friction protrusion portion is formed on the upper surface of the friction member and positioned in a direction toward the spring module.

7. The electronic pedal apparatus of claim 3, wherein a surface of the friction protrusion portion, which is in contact with the second end portion of the rotation lever, is formed as an inclined surface or an arc-shaped curved surface.

8. The electronic pedal apparatus of claim 1, wherein a gap having a predetermined size is formed between the pedal pad and the first end portion of the rotation lever in a situation that the pedal pad is not operated, and the gap is increased by a rotation of the rotation lever in response that the driver operates the pedal pad.

9. The electronic pedal apparatus of claim 1, wherein in a situation that the driver does not operate the pedal pad, a position of the second connection pin is positioned to be closer to the pedal pad than a position of the first connection pin to the pedal pad in a longitudinal direction of the spring module, and wherein after a rotation of the pedal pad is completed, the position of the first connection pin is positioned to be closer to the pedal pad than the position of the second connection pin to the pedal pad.

10. The electronic pedal apparatus of claim 3, further including an operating characteristic protrusion protruding from a surface of the friction protrusion portion, wherein operating characteristics of the pedal are implemented when the second end portion of the rotation lever is in contact with the operating characteristic protrusion and passes the operating characteristic protrusion in response that the rotation lever rotates.

11. The electronic pedal apparatus of claim 1, wherein a portion between the first end portion of the rotation lever coupled to the spring module and the second end portion of the rotation lever being in contact with the friction member is bent with an obtuse angle about the first connection pin.

12. The electronic pedal apparatus of claim 1, further including:

a first permanent magnet coupled to the pedal pad; and a first printed circuit board (PCB) coupled to the pedal housing to face the first permanent magnet, wherein the first PCB is configured to generate a signal related to a pedal function of the electronic pedal apparatus by recognizing a change in magnetic flux of the first permanent magnet in response that the pedal pad rotates.

13. The electronic pedal apparatus of claim 12, further including:

a second permanent magnet coupled to the pedal pad; and a second PCB coupled to the pedal housing to face the second permanent magnet, wherein the second PCB is configured to generate a signal related to a pedal function of the electronic pedal apparatus by recognizing a change in magnetic flux of the second permanent magnet in response that the pedal pad rotates.

14. The electronic pedal apparatus of claim 13, wherein the first permanent magnet is coupled at a position on the pedal pad farthest from the hinge pin, and the second permanent magnet is coupled at a position relatively closer to the hinge pin than the position of the first permanent magnet to the hinge pin, and wherein in a situation that the pedal pad operates, the first permanent magnet has a relatively larger movement displacement than the second permanent magnet so that the first permanent magnet is used as a main sensor, and the second permanent magnet includes a relatively smaller movement displacement than the first permanent magnet so that the second permanent magnet is used as a redundancy sensor.

15. The electronic pedal apparatus of claim 13, wherein the first permanent magnet is coupled at a front end portion of the pedal pad farthest from the hinge pin, and the second permanent magnet is coupled to one side surface relatively closer to the hinge pin than the first permanent magnet to the hinge pin without being affected by the first permanent magnet.

16. The electronic pedal apparatus of claim 1, further including a pad protrusion portion and a first stopper portion, wherein the pad protrusion portion is formed at a front side of the pedal pad, and the first stopper portion is provided at a front side of the pedal housing and disposed at a portion facing the pad protrusion portion, and wherein in a situation that the pad protrusion portion and the first stopper portion come into contact with each other, an initial position of the pedal pad and a return position of the pedal pad made by a spring force of the spring module are restricted.

17. The electronic pedal apparatus of claim 16, further including a second stopper portion, wherein the second stopper portion is formed at the front side of the pedal housing and disposed below the first stopper portion, and a full-stroke position of the pedal pad is restricted in a situation that the pedal pad is rotated and inserted into the pedal housing and the pad protrusion portion comes into contact with the second stopper portion.

18. The electronic pedal apparatus of claim 17, further including a third stopper portion, wherein the hinge pin is coupled to a lower connection portion of the pedal pad, the third stopper portion is provided on the pedal housing and protrudes toward the lower connection portion, and the full-stroke position of the pedal pad is restricted in a situation that the pedal pad is rotated and inserted into the pedal housing and the lower connection portion comes into contact with the third stopper portion.

19. The electronic pedal apparatus of claim 18, wherein the full-stroke position of the pedal pad is restricted by simultaneous contact between the pad protrusion portion and the second stopper portion and between the lower connection portion and the third stopper portion.

* * * * *